United States Patent
McWilliams

(10) Patent No.: US 8,177,996 B2
(45) Date of Patent: May 15, 2012

(54) APPARATUS, SYSTEM AND METHOD OF PROVIDING A DE-ICING SALINE SOLUTION FOR RESIDENTIAL USE

(76) Inventor: Thomas J McWilliams, Bryn Mawr, PA (US)

( * ) Notice: Subject to any disclaimer, the term of this patent is extended or adjusted under 35 U.S.C. 154(b) by 0 days.

(21) Appl. No.: 12/932,504

(22) Filed: Feb. 25, 2011

(65) Prior Publication Data

US 2012/0074350 A1    Mar. 29, 2012

Related U.S. Application Data

(60) Provisional application No. 61/339,124, filed on Feb. 26, 2010.

(51) Int. Cl.
    *C09K 3/18*      (2006.01)
    *B05B 9/00*      (2006.01)
    *B05B 17/00*     (2006.01)

(52) U.S. Cl. .................. 252/70; 106/13; 239/1

(58) Field of Classification Search .............. 106/13; 252/70; 239/1
See application file for complete search history.

(56) References Cited

U.S. PATENT DOCUMENTS

| | | | | |
|---|---|---|---|---|
| 3,384,590 | A * | 5/1968 | Eversole et al. | 252/70 |
| 3,928,654 | A * | 12/1975 | Bonnanzio | 427/8 |
| 4,161,280 | A * | 7/1979 | Kasinskas | 239/1 |
| 4,391,393 | A * | 7/1983 | Filmyer | 222/642 |
| 4,512,907 | A * | 4/1985 | McConnell | 252/70 |
| 4,698,173 | A * | 10/1987 | Hansen | 252/70 |
| 4,898,330 | A * | 2/1990 | Betchan | 239/135 |
| 5,211,869 | A * | 5/1993 | Steinhauser et al. | 252/70 |
| 5,891,225 | A * | 4/1999 | Mishra et al. | 106/14.42 |
| 6,270,020 | B1 * | 8/2001 | Thompson et al. | 239/67 |
| 7,063,803 | B2 * | 6/2006 | Seo | 252/70 |
| 7,588,195 | B2 * | 9/2009 | Balogh | 239/201 |
| 7,721,975 | B2 * | 5/2010 | Zaharis | 239/1 |
| 2006/0180678 | A1 * | 8/2006 | Balogh | 239/1 |
| 2006/0266853 | A1 * | 11/2006 | Gamble et al. | 239/661 |

* cited by examiner

*Primary Examiner* — Anthony J Green
(74) *Attorney, Agent, or Firm* — Thomas J. McWilliams; Edward F. Behm, Jr.

(57) ABSTRACT

A residential de-icing apparatus, system and method. The apparatus, system and method include a first saline solution having a salinity in a range of 150-360 ppt, a residential container having a volume in a range of 2-5 gallons, a second saline solution resident in the residential container and having a salinity in a range of 30 ppt-250 ppt, wherein the second saline solution results from a mixing of the first saline solution with a volume of water, and a hand-held output nozzle physically associated with the residential container for dispersing the second saline solution at a rate in a range of 6-12 gallons per ¼ mile.

15 Claims, 3 Drawing Sheets

APPARATUS, SYSTEM AND METHOD OF PROVIDING A DE-ICING SALINE SOLUTION FOR RESIDENTIAL USE

CROSS-REFERENCE TO RELATED APPLICATIONS

This application claims the benefit of priority to U.S. Provisional Patent Application Ser. No. 61/339,124, filed on Feb. 26, 2010 by inventor Thomas J. McWilliams, entitled "APPARATUS, SYSTEM AND METHOD OF PROVIDING A DE-ICING SALINE SOLUTION FOR RESIDENTIAL USE," the entirety of which is incorporated herein by reference as if set forth in its entirety.

BACKGROUND

1. Field of the Invention

The present invention relates to residential services, and, more particularly, to an apparatus, system and method of providing a de-icing saline solution for residential use.

2. Background of the Invention

Existing remedies for the buildup of ice and snow in a residential setting include salting and dispersion of solid chemicals in order to effectuate the de-icing process. However, the use of salts and other solids requires the purchase of bulky materials, such as bags of salt. Further, the disbursement of such salts or solids cannot be carefully monitored, and is physically exhausting and time consuming. For example, a user may expend significant time to put down salt crystals, but may use far too little to be effective, or so much as to be wasteful.

Moreover, crystalline salt, or similar solids, are not conducive to placement on out-of-the-way surfaces that require melting, such as on home gutters. Nevertheless, failure to melt ice in such places may cause damage to the home, such as due to the weight of ice buildup causing gutters to become detached from the residence, for example.

Thus, the need exists for an apparatus, system and method of providing a more effective and efficient de-icer for residential use.

SUMMARY OF THE INVENTION

The present invention is and includes a residential de-icing apparatus, system and method. As defined herein, "residential" use is the use of the apparatus, system and method for non-public, and thus namely private, purposes. The apparatus, system and method may, in one exemplary embodiment, include a first saline solution having a salinity in a range of 150-360 ppt, a residential container having a volume in a range of 2-5 gallons, a second saline solution resident in the residential container and having a salinity in a range of 30 ppt-250 ppt, wherein the second saline solution results from a mixing of the first saline solution with a volume of water, and a hand-held output nozzle physically associated with the residential container for dispersing the second saline solution at a rate in a range of 6-12 gallons per ¼ mile.

Thus, the present invention provides an apparatus, system and method of providing a more effective and efficient de-icer for residential use.

BRIEF DESCRIPTION OF THE FIGURES

Understanding of the disclosure will be facilitated by consideration of the following detailed description of the embodiments of the disclosure, taken in conjunction with the accompanying drawings, in which like numerals refer to like parts, and wherein.

DETAILED DESCRIPTION OF THE INVENTION

It is to be understood that the figures and descriptions of the disclosure have been simplified to illustrate elements that are relevant for a clear understanding, while eliminating, for the purpose of brevity, many other elements found in typical de-icing apparatuses, systems and methods. Those of ordinary skill in the art will thus recognize that other elements and/or steps are desirable and/or required in implementing the disclosure. However, because such elements and steps are well known in the art, a discussion of such elements and steps is not provided herein. The disclosure herein is directed to all such variations and modifications to such elements and methods known to those skilled in the art.

In the current art, de-icing is typically preformed in either a private setting or a public setting. In a private setting, de-icing typically consists of the placement of "rock salt," or similar solids, that, when contacted with ice, effect a chemical process whereby the ice is heated by the chemical interaction to the melting point. On the other hand, public de-icing cannot be conveniently performed in the manner of the aforementioned private de-icing, due principally to the large geographic area, such as over public roads, that must be covered by public de-icing. Consequently, public de-icing frequently consists of large machinery, such as trucks, that disperse a salt solution, i.e., a "saline solution," over the areas on which the ice is to be melted, either before or after formation of the ice. Of course, these public methods are, inapplicable in private use, in part because private citizens do not have access to such large machines to disperse saline solution, nor do private citizens have access to saline solution in a readily available form.

Figure 1:
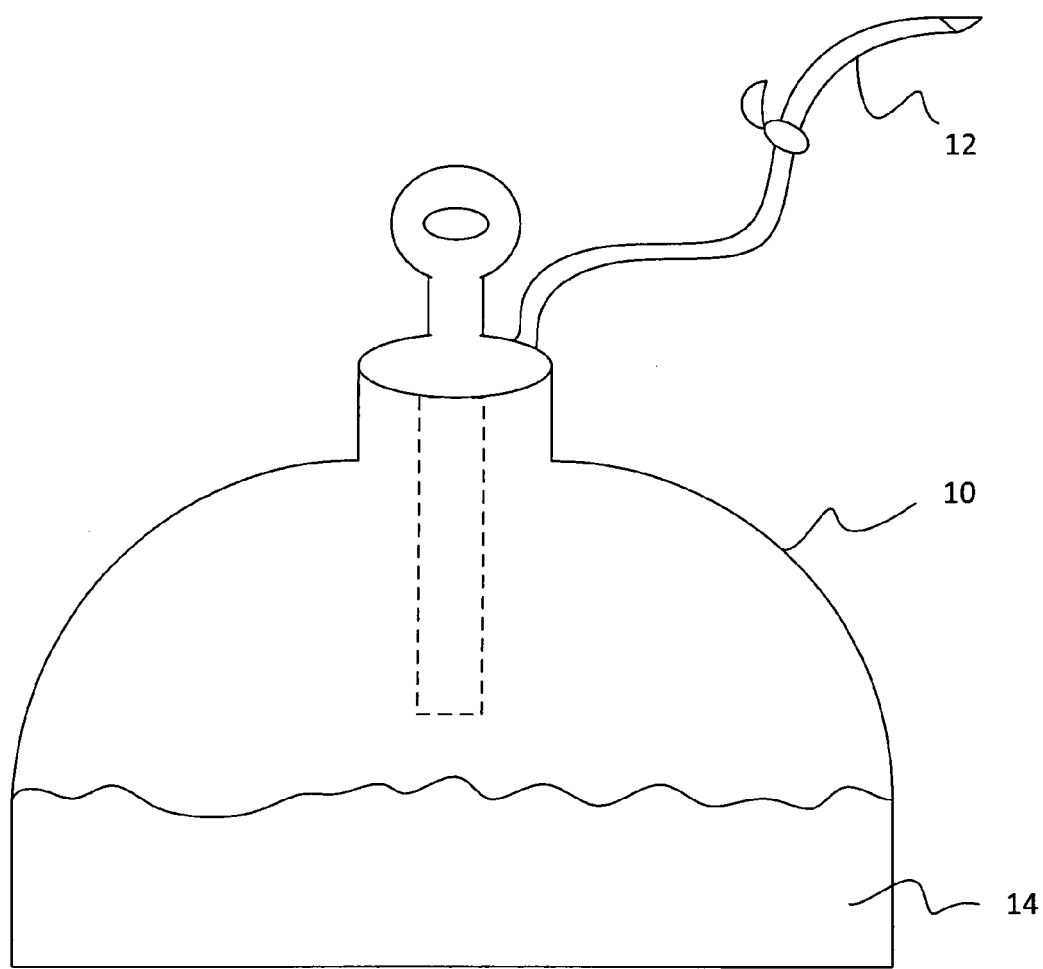
FIG. 1 is a schematic diagram illustrating aspects of a residential, saline solution de-icing apparatus.

FIG. 1 illustrates a container for providing saline solution for clearing, melting, or preemptively eliminating frozen or freezing precipitation, such as ice or snow, in accordance with the present invention. In accordance with FIG. 1, the container 10 may be, for example, a standard residential spray container, such as a 2-5 gallon capacity container, and may be provided with a metered flow nozzle 12, such as having one end for connection to a garden hose, metered entry of water from the garden hose into the container to perform a mixing of the water and the saline solution in the predetermined amount, and an outbound nozzle from which the mixed saline solution 14 may exit. Further, as will be appreciated by those skilled in the art based on the illustration of FIG. 1, the container may be substantially ovular or substantially rectangular in shape, for example. As will be understood by those skilled in the art, the outbound nozzle may work on a principle whereby air pressure is increased in the container until the saline solution flows outward, or wherein the water flowing inbound, such as from the hose nozzle or spigot, builds sufficient water pressure to cause the saline solution to spray outward. Additionally, it will be appreciated that, to the extent saline solution is provided in a predetermined concentration, the inbound flow may not be present.

The outbound nozzle 12 may allow for directional flow of the saline solution out of the container at the direction of a user of the container, either in volume dispersed, direction dispersed, spray strength dispersed, or several or all of the above. Further, due to the output of saline solution, the outbound nozzle may include anti-corrosive coatings to allow for repeated use with the saline solution. Of course, those skilled in the art will appreciate that a container may be used to provide the aqueous salt solution by simply opening the container and mixing therein the concentrated saline solution and the recommended quantity of water, or by providing the container with a proper concentration of saline solution already present therein.

Spray output of the mixed solution may then occur from the container. Additionally and alternatively, the saline solution may be output from an output nozzle 12 in the form of high output nozzle, such as via a conventional power washer. Such an output would allow a user to perform de-icing at points that are typically difficult to de-ice, but that may present highly detrimental circumstances if not de-iced, such as icing or snow on gutters or roofs which, if left untreated, my cause the collapse of gutters or roofs.

Those skilled in the art will appreciate that the saline solution need have a relatively high salt concentration to allow for mixing with water and outward spraying to cover a sufficient area to melt snow or ice on walkways, driveways, sidewalks, roofing, and the like. Of course, a different salinity may be provided to treat more sensitive areas, such as locations where pets may walk, and/or on car windows or cars, for example.

Those skilled in the art will appreciate that the maximum salinity that can be obtained in a typical aqueous solution is approximately 360 parts NaCl per thousand (ppt). Those skilled in the art will further appreciate that the minimum salinity of an aqueous solution that allows for the melting of frozen water is approximately 25 ppt, dependent upon temperature. Therefore, it is most desirable that the aqueous solution of the present invention be provided having a salinity in the range of 30-100 ppt, wherein a concentration between 50 and 250 ppt will allow for maximum area coverage of the resulting saline solution when mixed with water. Those skilled in the art will further appreciate, in light of the disclosure herein, that, when a concentration approaching 350 ppt is mixed with water, it is most desirable that the resulting combination be at least 30 ppt, and preferably be of slightly higher salinity. Those skilled in the art will further appreciate that a saline solution may not be fully soluble in water, and consequently a saline solution of slightly higher salinity upon mixing may be desirable.

Figure 2:
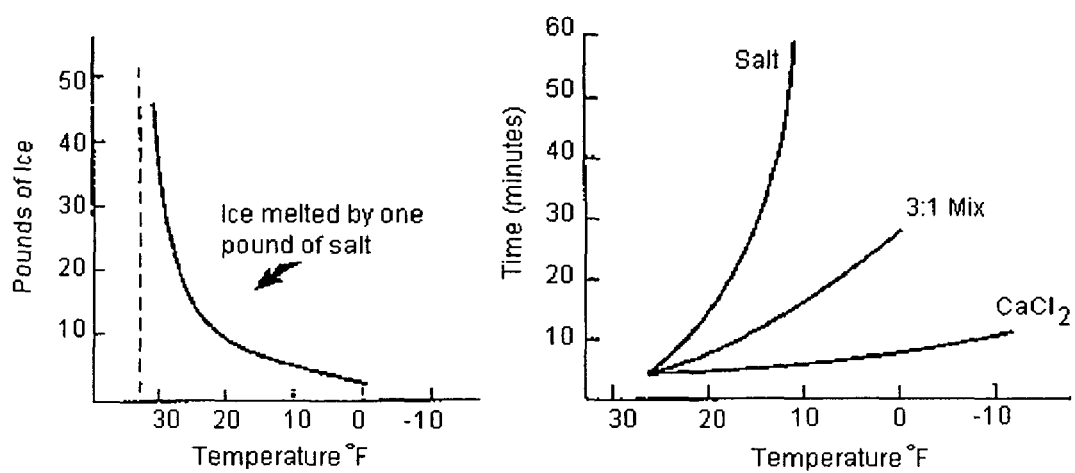
FIG. 2 is a chart of melting rates for de-icers.

Of course, if the pre-mixed solution is of too high a salinity, not all of it will dissolve into solution. On the other hand, too little salinity in the post-mixing solution may not sufficiently lower the solution's freezing point, and hence will limit the ability to melt. More specifically, the surface temperature of a snow- or ice-covered driveway may determine de-icing salinity and melting rates. As temperature decreases, the amount and salinity of de-icer needed to melt a given quantity of ice increases significantly. FIG. 2 illustrates that salt can melt five times as much ice at 30° F. as at 20° F. Melting rates may also depend on the porosity and heat dissipating capabilities of the applied surface.

Finally, the dispersal rate for the de-icing solution of the present invention may effect melting rate. It is suggested that a dispersal rate of rate in a range of 5-18 gallons per ¼ mile be employed. Those skilled in the art will appreciate that, as used herein, a saline solution may include dissolved salt pre-mixing and post-mixing, but may additionally include dissolved calcium chloride, CMA and/or magnesium chloride, by way of non-limiting example.

Figure 3:
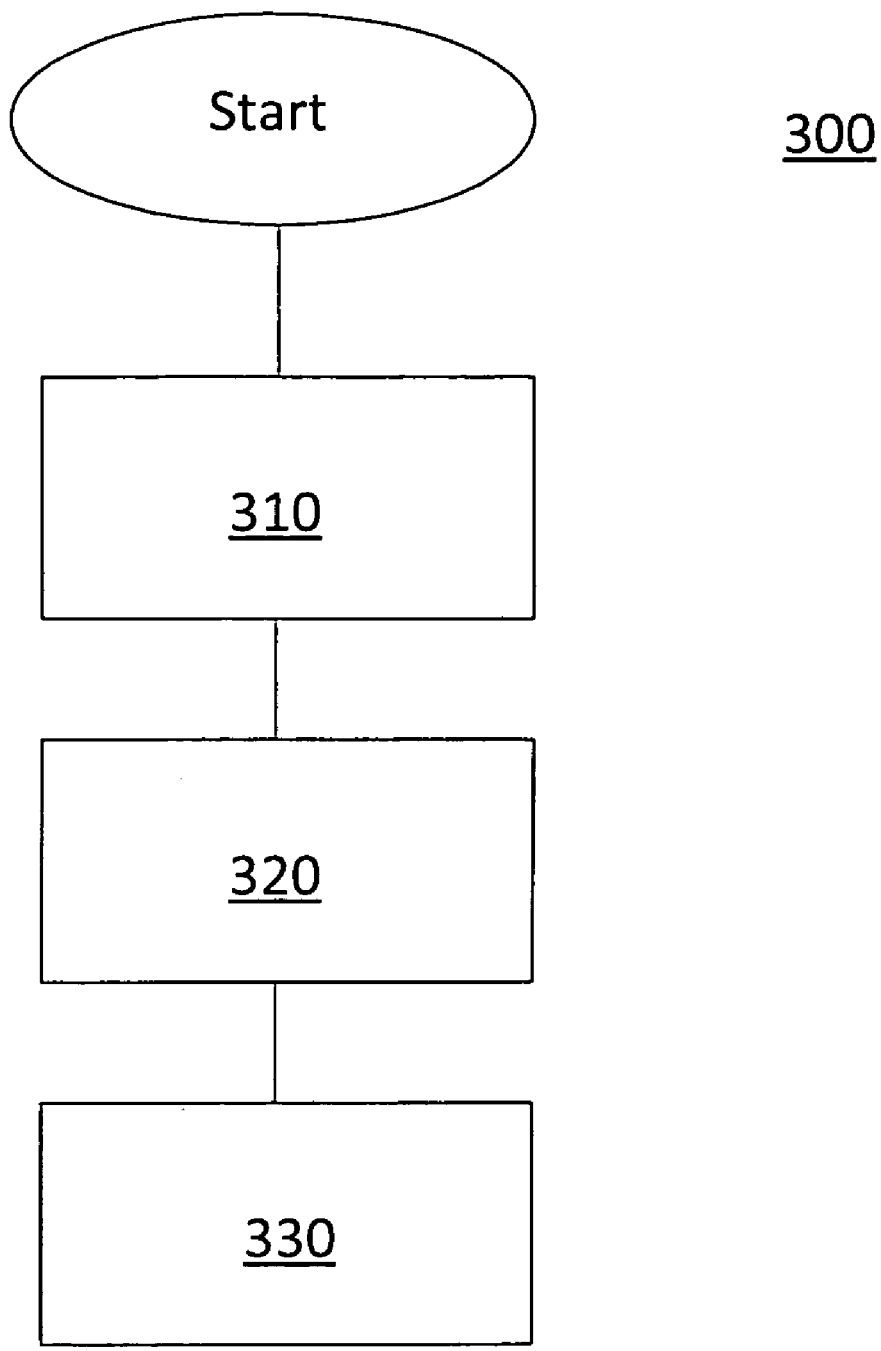
FIG. 3 is a flow diagram illustrating an exemplary method in accordance with the present invention.

A method 300 in accordance with the apparatus of FIG. 1 may be readily performed in a private, residential setting, as illustrated in FIG. 3. For example, the method 300 may include providing an initial volume of concentrated saline solution at step 310. The method may further including directing mixing of the concentrated solution with a volume of water to form 2-5 gallons of a secondary concentrated saline solution having lower salinity than the initial volume at step 320. Yet further, the method may include directing the dispersion of the secondary concentrated solution in a ratio of approximately 5-18 gallons per ¼ mile at step 330.

Although the disclosure has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the disclosure as set forth in the claims hereinafter.

What is claimed is:

1. A de-icer, comprising:
   a first saline solution comprising at least one of NaCl, CaCl, CMA and MgCl, comprising a solution having a first salinity in a range of 150 to 360 ppt;
   a residential container having a volume in a range of 2 to 5 gallons;
   a second saline solution resident in said residential container and having a second salinity in a range of 30 ppt to 250 ppt, wherein said second saline solution results from a mixing of said first saline solution with a volume of water;
   a hand-held output nozzle physically associated with said residential container for dispersing said second saline solution at a rate in a range of 5 to 18 gallons per ¼ mile.

2. The de-icer of claim 1, wherein said hand-held output nozzle comprises a power washer nozzle.

3. The de-icer of claim 1, wherein said residential container comprises a substantially oval shape having a series of substantially circular cross sections.

4. The de-icer of claim 1, wherein said residential container comprises a substantially rectangular shape.

5. The de-icer of claim 1, wherein said hand-held output nozzle further comprises a metered flow nozzle suitable for controlling the mixing.

6. The de-icer of claim 5, wherein said metered flow nozzle further comprises a water input.

7. The de-icer of claim 6, wherein the water input is suitable for connection to a garden hose.

8. The de-icer of claim 6, wherein said output nozzle is suitable for dispersing responsive to a water pressure at the water input.

9. The de-icer of claim 1, wherein said output nozzle is suitable for dispersing responsive to a pressure within said residential container.

10. The de-icer of claim 1, wherein said output nozzle is suitable for controlling the dispersing according to at least one selected from the group consisting of volume dispersed, direction dispersed, and spray strength dispersed.

11. The de-icer of claim 1, wherein said output nozzle comprises at least one anti-corrosive coating.

12. The de-icer of claim 1, wherein the second salinity is in a range of 30 to 100 ppt.

13. The de-icer of claim 1, wherein said a hand-held output nozzle disperses said second saline solution at a rate in a range of 6 to 12 gallons per ¼ mile.

14. The de-icer of claim 1, wherein said second saline solution further comprises at least one of calcium chloride, CMA and magnesium chloride.

15. A method of de-icing a private location, comprising:
providing an initial volume of concentrated NaCl or MgCl saline solution having a first salinity in a range of 150 to 360 ppt;
directing a mixing of the concentrated solution with a volume of water to form 2-5 gallons of a secondary concentrated NaCl or MgCl saline solution having second salinity lower than the first salinity; and
directing a dispersion of the secondary concentrated solution in a ratio of approximately 5-18 gallons per ¼ mile.

* * * * *